(12) United States Patent
Yang et al.

(10) Patent No.: US 9,550,181 B2
(45) Date of Patent: *Jan. 24, 2017

(54) FISCHER-TROPSCH CATALYST, PREPARATION METHOD AND APPLICATION THEREOF

(75) Inventors: Yong Yang, Taiyuan (CN); Baoshan Wu, Taiyuan (CN); Yongwang Li, Taiyuan (CN); Hongwei Xiang, Taiyuan (CN)

(73) Assignee: SYNFUELS CHINA TECHNOLOGY CO., LTD., Shanxi (CN)

( * ) Notice: Subject to any disclaimer, the term of this patent is extended or adjusted under 35 U.S.C. 154(b) by 839 days.

This patent is subject to a terminal disclaimer.

(21) Appl. No.: 13/203,537

(22) PCT Filed: Mar. 11, 2010

(86) PCT No.: PCT/CN2010/070988
§ 371 (c)(1),
(2), (4) Date: Aug. 26, 2011

(87) PCT Pub. No.: WO2010/102573
PCT Pub. Date: Sep. 16, 2010

(65) Prior Publication Data
US 2011/0306683 A1    Dec. 15, 2011

(30) Foreign Application Priority Data

Mar. 12, 2009 (CN) .......................... 2009 1 0128421

(51) Int. Cl.
| | | |
|---|---|---|
| B01J 21/00 | (2006.01) |
| B01J 23/00 | (2006.01) |
| B01J 25/00 | (2006.01) |
| B01J 29/00 | (2006.01) |
| B01J 37/03 | (2006.01) |
| B01J 23/78 | (2006.01) |
| B01J 23/887 | (2006.01) |
| B01J 23/889 | (2006.01) |
| B01J 35/02 | (2006.01) |
| B01J 37/00 | (2006.01) |
| C10G 2/00 | (2006.01) |
| B01J 35/10 | (2006.01) |

(52) U.S. Cl.
CPC ................. *B01J 37/03* (2013.01); *B01J 23/78* (2013.01); *B01J 23/8878* (2013.01); *B01J 23/8892* (2013.01); *B01J 23/8898* (2013.01); *B01J 35/023* (2013.01); *B01J 37/0045* (2013.01); *C10G 2/332* (2013.01); *C10G 2/342* (2013.01); *B01J 35/1019* (2013.01); *B01J 35/1038* (2013.01)

(58) Field of Classification Search
USPC ......... 518/700; 502/325, 100, 232, 240, 256
See application file for complete search history.

(56) References Cited

U.S. PATENT DOCUMENTS

| | | | | |
|---|---|---|---|---|
| 4,521,540 A | * | 6/1985 | Pierantozzi ........... | C07C 29/156 502/161 |
| 2004/0106517 A1 | * | 6/2004 | Dlamini ................... | B01J 23/80 502/326 |
| 2004/0122115 A1 | * | 6/2004 | Espinoza ............. | B01J 23/8946 518/721 |

FOREIGN PATENT DOCUMENTS

| | | |
|---|---|---|
| CN | 1600420 A | 3/2005 |
| CN | 1600421 A | 3/2005 |
| CN | 101293206 A | 10/2008 |
| CN | 101293206 A | 10/2008 |
| CN | 101298046 A | 11/2008 |
| CN | 101298046 A | 11/2008 |

OTHER PUBLICATIONS

International Search Report, Int'l. Application No. PCT/CN2010/070988, Jun. 17, 2010, 8 pages.
(Continued)

*Primary Examiner* — James McDonough
(74) *Attorney, Agent, or Firm* — Seyfarth Shaw LLP

(57) ABSTRACT

A micro-spherical iron-based catalyst and a preparation method thereof are disclosed. The catalyst contains a potassium promoter, and at least one transitional metal promoter M which is one or more kinds of metals selected from Cr, Cu, Mn and Zn. It also contains a structure promoter S, which is $SiO_2$ and/or $Al_2O_3$, wherein both of $SiO_2$ and $Al_2O_3$ are modified by $MoO_3$, $TiO_2$ and/or $ZrO_2$. The weight ratio of components is Fe:M:K:S=100:3-50:1-8:3-50, in which the metal components are calculated based on metal elements, the structure promoter is calculated based on oxides. The catalyst is prepared by co-precipitation method.

14 Claims, No Drawings

(56) References Cited

OTHER PUBLICATIONS

Baoshan Wu et al., Title: Catalytic Performance of Iron-Based Catalysts Prepared Using Different Precipitating Agents for Fischer-Tropsch Synthesis,. Chinese Journal of Catalysis, May 2005, pp. 371-376, vol. 26 No. 5.
Runping Wang et al., Title: Summary on the Research of Assistants of Iron-Based Catalysts for Fischer-Tropsch Synthesis, Tianjin Chemical Industry, Jan. 2008, pp. 17-19, vol. 22 No. 1.
English Abstract for CN 101298046, 1 page.
English Abstract for CN 101293206, 1 page.
English Abstract for CN 1600420, 1 page.
English Abstract for CN 1600421, 1 page.
Australian Patent Examination Report No. 1, dated Aug. 30, 2010, 3 pages.
Catalytic Performance of Iron-Based Catalysts Prepared Using Different Precipitating Agents for Fischer-Tropsch Synthesis, Chinese Journal of Catalysis, vol. 26, No. 5, May 2005, pp. 371-376 (Wu, Baoshan et al.).

\* cited by examiner

US 9,550,181 B2

FISCHER-TROPSCH CATALYST, PREPARATION METHOD AND APPLICATION THEREOF

This application is a U.S. National Phase of International Patent Application Serial No. PCT/CN2010/070988 filed Mar. 11, 2010, and claims priority to Chinese Application Serial No. CN 200910128421.1 filed Mar. 12, 2009.

FIELD OF THE INVENTION

This invention relates to a micro-spherical iron-based catalyst for the Fischer-Tropsch synthesis process and a preparation method thereof. In the Fischer-Tropsch synthesis process, the catalyst has the following advantages: high strength, high reactive activity, suitability for high temperature operation, and significant tendency in hydrocarbon products selectivity to those hydrocarbons with a medium-carbon number distribution. The invention also relates to a method using the catalyst according to the present invention for the Fischer-Tropsch synthesis reaction and using the catalyst for the Fischer-Tropsch synthesis process, especially for a Fischer-Tropsch synthesis process in a high temperature slurry bed reactor.

BACKGROUND OF THE INVENTION

The Fischer-Tropsch synthesis (hereinafter referred to as "F-T") is a chemical reaction process for producing liquid fuels from syngas ($H_2$+CO) in the presence of metal catalyst under appropriate conditions. Since it was first discovered in Germany by Franz Fischer and Hans Tropsch in 1923, the Fischer-Tropsch synthesis process has undergone a significant development over 80 years in many respects such as catalyst, reactor and their corresponding reaction process.

Iron-based and cobalt-based catalysts are two major types of catalysts for the Fischer-Tropsch synthesis process, and the iron-based catalyst is divided into three categories for different reactions and process systems, including a precipitated iron catalyst, a supported iron catalyst, and a fused iron catalyst, respectively.

Fischer-Tropsch synthesis reactors have been developed from tubular fixed bed reactors to fluidized reactors (fixed fluidized beds and circulating fluidized beds), until recently the most advanced slurry bed reactors. Compared with other processes, the Fischer-Tropsch synthesis process in the slurry bed reactors has the following advantages:

(1) Ability to using coal-based syngas with low $H_2$/CO ratio produced in modern coal gasifiers as feed gas, and reduction of coal-based syngas transformation load.
(2) Excellent heat exchange efficiency, good performance in temperature control.
(3) Simple construction, lower costs, running feasibility under high space velocity of feed gas, and significantly higher production efficiency than that of the fixed bed reactor.
(4) Easy loading and unloading of catalyst which can be reduced or supplementarily added in-situ, and significant improvement in efficient run time.

However, the current slurry bed process is normally operated at 230-250° C. and about 25% of the syngas energy is released in the form of heat in this reaction process. Therefore, a large amount of low-grade steam of 0.8-1.0 MPa is produced if the process is operated at a lower temperature, and such steam is difficult to be utilized, which leads to a total energy conversion efficiency of only 38-41%. Therefore, it is necessary to increase the operating temperature of the slurry bed in the Fischer-Tropsch synthesis, thus the total energy conversion efficiency can be further improved in this process.

However, the high-temperature Fischer-Tropsch synthesis is generally achieved in the high temperature fluidized bed reactor with a fused iron catalyst. The catalyst used for the high temperature Fischer-Tropsch synthesis in Sasol Company is a fused iron catalyst, in which magnetite (its main component is $Fe_3O_4$) is used as the main raw material, melted at about 1500° C. and then added promoters such as $K_2O$, CaO or $Al_2O_3$. The specific surface area of the catalyst is low, but its high strength is suitable for high-temperature operation. Another kind of the high-temperature Fischer-Tropsch synthesis catalyst is prepared by co-precipitation, such as a Fe—Cu—K catalyst disclosed in U.S. Pat. No. 6,844,370 by Sasol Company, and a precipitated Fe—Cu—Cr—K—Na catalyst disclosed in several China patents of CN1695803A, CN1695804A, and CN1817451A by Yanzhou Mining Group Co., Ltd. All of the above catalysts are suitable for a high temperature fluidized bed reactor. The selectivity data published have shown that methane is less than 10%, and $C_{23+}$ hydrocarbons are more than 65%; and the heavy hydrocarbons are obviously increased, compared with that of the high temperature fused iron catalyst.

The Fischer-Tropsch synthesis operated in a high temperature slurry bed reactor requires that the catalyst has sufficiently high mechanical strength to withstand high temperature, high gas flow rate, high amount of steam generated (for the iron-based catalyst), and other unfavorable factors under three-phase reaction conditions. Patent CN1213802C jointly applied by Dalian Institute of Chemical Physics, Chinese Academy of Sciences and China Petroleum & Chemical Corporation disclosed a kind of two-active-component supported iron-based catalyst, which is prepared only in a laboratory small scale. The catalyst can be operated in a slurry bed reactor for syngas to selectively synthesize gasoline and diesel oil fractions ($<C_{20}$) and the reactive temperature can be up to 300° C., but the preparation process is complex and difficult to achieve a scale-up of process.

The main difficulties of catalyst being operated in the high temperature slurry bed are that the iron-based catalyst will produce complex thermo-chemical strain, which will result in severe chemical and physical abrasion. Meanwhile, both desorption and dissociation ability of the catalyst for CO and $H_2$ will change significantly at a higher temperature. These problems will affect the stable operation of the catalyst in the high temperature slurry bed.

The present inventors have synthesized a kind of catalyst after a lot of research work, using an advanced catalyst design method and a new catalyst preparation process with co-precipitation as the main step. The produced catalyst for the Fischer-Tropsch synthesis in a slurry bed reactor has the following advantages: high strength, suitability for high temperature operation, and significant tendency in hydrocarbon products selectivity to those hydrocarbons with a medium-carbon number distribution. Also, the active component content in the catalyst is in a high level, uniformly dispersed, high active and stable; and the catalyst has high anti-abrasion strength and better distribution of hydrocarbon products than that of the low temperature process, and improvement in the total energy conversion efficiency for the Fischer-Tropsch synthesis process; especially it is suitable for operating at a higher temperature (250-300° C.), and thus obtains a higher grade of steam.

SUMMARY OF THE INVENTION

The objective of the present invention is to provide a Fischer-Tropsch synthesis catalyst. The catalyst is a micro-spherical iron-based catalyst with a high mechanical strength, high anti-abrasion property and suitability for the Fischer-Tropsch synthesis in a high temperature slurry bed reactor. The catalyst has a excellent mechanical strength when operated in the Fischer-Tropsch synthesis in a slurry bed reactor and can be operated in a higher temperature, such as 250-300° C. Besides, both the conversion ability and space-time yield of snygas are higher, and a tendency in hydrocarbon products selectivity to those hydrocarbons with a medium-carbon number distribution is significant.

The invention discloses a micro-spherical iron-based catalyst for the Fischer-Tropsch synthesis process in a high temperature slurry bed reactor. In the catalyst, the main active component is Fe, characterized in that the catalyst further comprises a potassium promoter (hereinafter, also referred to as K promoter), a transitional metal promoter M, and a modified structure promoter S, wherein the transitional metal promoter M is one kind of metal or a combination of more kinds of metals selected from Cr, Cu, Mn and Zn; the structure promoter S is $SiO_2$ and/or $Al_2O_3$, both of $SiO_2$ and $Al_2O_3$ are modified by $MoO_3$, $TiO_2$ and/or $ZrO_2$; and the weight ratio of each component is Fe:M:K:S=100:1-100:1-12:1-80, preferably Fe:M:K:S=100:3-50:1-8:3-50; wherein the metal components are calculated based on metal elements, and the structure promoter is calculated based on oxides.

In the iron-based catalyst according to the present invention, the transitional metal promoter M is one or more kinds of metals selected from Cr, Cu, Mn and Zn, preferably the transitional metal promoter M contains two or more kinds of these metals; more preferably, the transitional metal promoter M contains three or four kinds of these metals. When the transitional metal promoter M contains two or more kinds of these metals, they can exist in any proportion.

In the iron-based catalyst according to the present invention, the weight ratio of each component in the structure promoter S is calculated based on oxides: ($MoO_3$, $TiO_2$ and/or $ZrO_2$):($SiO_2$ and/or $Al_2O_3$)=1-50:100, preferably, ($MoO_3$, $TiO_2$ and/or $ZrO_2$):($SiO_2$ and/or $Al_2O_3$)=1-30:100. In the structure promoter S, one or two components selected from $ZrO_2$, $TiO_2$ and $MoO_3$ is preferable; the components can be in any proportion when two or three of them exist simultaneously; and $SiO_2$ and $Al_2O_3$ can exist in any proportion.

Another objective of the present invention is to provide a preparation method for the iron-based catalyst mentioned above. In the method, the metal Fe, the transitional metal M and nitric acid are used as raw materials or the solution of the metal nitrates as raw material, to prepare the catalyst using the routine co-precipitation method in the art.

The method according to the present invention comprises the following steps:
(1) preparing a solution of metal nitrates by using metal Fe, a transitional metal M and nitric acid as raw materials, or directly dissolving the metal nitrates to prepare a mixed solution of the metal nitrates; wherein the transitional metal M is one or more kinds of metals selected from Cr, Cu, Mn and Zn;
(2) adding a solution or slurry of a structure promoter S into the solution of the metal nitrates prepared in the step (1) and mixing well to obtain a mixed solution;
(3) adding ammonia water as a precipitant into the mixed solution of the step (2), or adding the mixed solution of the step (2) into the precipitant of ammonia water, or co-precipitating the mixed solution of the step (2) with the precipitant of ammonia water by coflowing to prepare a precipitated slurry;
(4) filtering the precipitated slurry to obtain a filter cake of catalyst;
(5) adding deionized water and a precursor of the K promoter into the filter cake, and pulping to obtain a catalyst slurry; and
(6) molding the catalyst slurry prepared in the step (5) by spray-drying into micro-spherical shape, and then roasting to obtain the micro-spherical iron-based catalysts.

In the above steps, the addition of the structure promoter in the step (2) can be changed to be performed after the addition of the precursor of the K promoter in the step (5); or respectively adding part of the structure promoter in the steps (2) and (5).

In particular, the preparation method of the catalyst according to the present invention comprises the following steps:
(1) preparing a solution of metal nitrates by using metal Fe, a transitional metal M and nitric acid as raw materials, or directly dissolving the metal nitrates to prepare a mixed solution of the metal nitrates, and the solution of the metal nitrates is in a total concentration of 5-45 wt %; wherein the transitional metal M is one or more kinds of metals selected from Cr, Cu, Mn and Zn;
(2) adding a solution or slurry of a structure promoter S into the solution of the metal nitrates prepared in the step (1) and mixing well to obtain a mixed solution;
(3) adding ammonia water in a concentration of 1-25 wt % as a precipitant, co-precipitating by coflowing the mixed solution of the step (2) to prepare a precipitated slurry, and a precipitation temperature being 20-95° C., and a pH value of the precipitated slurry after precipitation being 5-10;
(4) filtering the precipitated slurry to obtain a filter cake of catalyst with a solid content of 5-60 wt %;
(5) adding deionized water and a precursor of the K promoter into the filter cake, and pulping to obtain a slurry, adjusting the pH value of the slurry to 4-10 and emulsifying to obtain a catalyst slurry with a solid content of 3-50 wt %; and
(6) molding the catalyst slurry prepared in the step (5) by spray-drying into micro-spherical shape, and then roasting the catalyst molded by drying in an inert atmosphere or an air atmosphere to obtain the desired micro-spherical iron-based catalysts.

In the above steps, the addition of the structure promoter in the step (2) can be changed to be performed after the addition of the precursor of the K promoter in the step (5); or respectively adding part of the structure promoter in the steps (2) and (5).

The method is characterized in that the active component is dispersed and solidified step by step in the catalyst preparation process.

Herein, in the preparation method according to the present invention, the expression of "to achieve the desired catalyst composition" refers to the amount of each component or the precursor thereof can ensure the ratio of each component in the final catalyst to meet the ratio described above.

In the preparation method according to the present invention, the solution of the metal nitrates with an appropriate concentration in the step (1) can be directly prepared by using the metal nitrates; more preferably, the solution of the metal nitrates prepared in the step (1) is in a total concentration of 5-45 wt %, preferably 10-40 wt %.

In the above method, the addition of the solution or slurry of the structure promoter S can be totally performed in the step (2) or the step (5), or the addition is performed by adding part of the solution or slurry in the steps (2) and (5), respectively. Preferably, the addition is performed by adding part of the solution or slurry in the steps (2) and (5) respectively. When respectively adding part of the solution or slurry in the steps (2) and (5), preferably, the weight ratio between Fe and the structure promoter S is Fe:S=100:2-25 after adding in the step (2); more preferably, the weight ratio between Fe and the structure promoter S is that Fe:S is not less than 100:25 after adding in the step (2).

In the method according to the present invention, the solution or slurry of the structure promoter S is prepared by the following steps: zirconium salt, titanium salt and/or a solution of molybdate are slowly added to a silica sol and/or an alumina sol and stirred well at room temperature.

In the above method according to the present invention, a continuous co-precipitation method by coflowing is preferred in the step (3); In the above co-precipitation process, the ammonia water is in a concentration of 1-25 wt %, preferably 5-20 wt %; the precipitation temperature is 20-95° C., preferably 50-90° C., and the pH value in the precipitation process is 5-10, preferably 6-9.5.

In the above method according to the present invention, the solid content in the filter cake of the catalyst is 5-60 wt %, preferably 15-55 wt % after filtering in the step (4), and the ammonium nitrate content in the filter cake is less than 1.5 wt % after the filter cake being washed.

In the above method according to the present invention, in the step (5), the precursor of the K promoter added is soluble potassium salts such as potassium nitrate, potassium carbonate, potassium bicarbonate or potassium salts of organic acids, and the like; preferably, the pH value of the catalyst slurry obtained after pulping is 4-10, preferably 5.0-9.5 and the solid content of the catalyst slurry in the step (5) is 3-50 wt %, preferably 10-40 wt %.

In the above method according to the present invention, the molding process by spray-drying in the step (6) are performed by using routine equipments and methods, preferably in a pressurized spray-drying tower, the process conditions is: an air inlet temperature is 150-450° C. and an air outlet temperature is 70-200° C.; preferably, the air inlet temperature is 180-420° C. and the air outlet temperature is 85-150° C.

In the method according to the present invention, the roasting temperature in the step (6) is 300-750° C. and the roasting time is 1-10 hours, preferably, the roasting temperature is 350-700° C. and the roasting temperature is 2-8 hours.

More preferably, the preparation method of the iron-based catalyst according to the present invention comprises the following steps:

(1) preparing a mixed solution of metal nitrates by dissolving the desired metal nitrates according to the composition of the catalyst, and the solution of the metal nitrates is in a total concentration of 10-40 wt %;

(2) adding part of a solution or slurry of a structure promoter S into the solution of the metal nitrates prepared in the step (1), and the weight ratio between Fe and the structure promoter S after the addition is that Fe:S is not less than 100:25; then adding the obtained solution or slurry into a solution of iron nitrate and mixing well;

(3) adding ammonia water in a concentration of 5-20 wt % as a precipitant, co-precipitating by coflowing the mixed solution of the step (2) to prepare a precipitated slurry, and a precipitation temperature being 50-90° C., and a pH value of precipitation being 6-9.5;

(4) filtering the precipitated slurry to obtain a filter cake of catalyst with a solid content of 15-55 wt %;

(5) adding deionized water and a precursor of the K promoter into the filter cake, then adding the remaining part of the solution or slurry of the structure promoter S in the step (2), and pulping to achieve the desired catalyst composition, adjusting the pH value of the obtained slurry to 4-10 and emulsifying to obtain a catalyst slurry with a pH value of 5.0-9.5 and a solid content of 10-40 wt %; and (6) molding the catalyst slurry prepared in the step (5) by spray-drying in a pressurized spray-drying tower into micro-spherical shape, and then roasting the catalyst molded by drying in an inert atmosphere or an air atmosphere to obtain the desired catalysts.

Preferably, in the spray-drying process, the air inlet temperature is 180-420° C. and the air outlet temperature is 85-150° C.; preferably, the roasting temperature of the roasting process is 350-700° C. and the roasting time is 2-8 hours.

Another objective of the present invention is to provide an application of the catalyst according to the present invention for the Fischer-Tropsch synthesis, especially for a Fischer-Tropsch synthesis process in a high temperature slurry bed reactor. The Fischer-Tropsch synthesis reaction can be performed in the slurry bed reactor using catalyst according to the present invention at a high temperature of 250-300° C. to convert syngas into liquid hydrocarbons. Using the catalyst according to the present invention not only can improve the conversion ability and space-time yield of syngas, but also can make significant tendency in hydrocarbon products selectivity to those hydrocarbons with a medium-carbon number distribution; at the same time, the selectivity of methane is much lower than that of the existing low temperature slurry bed process, which can be controlled at 4 wt % or less.

The further objective of the present invention is to provide a Fischer-Tropsch synthesis method, in which the Fischer-Tropsch synthesis reaction is performed in a slurry bed reactor at a high temperature of 250-300° C. to convert syngas into liquid hydrocarbons. This method is characterized in that the catalyst used in the F-T synthesis reaction is the micro-spherical iron-based catalyst according to the present invention.

Compared to the prior art, the present invention has the following advantages:

(1) The catalyst composition and design concept is novel in the present invention. The structure promoter is added in the following different manners: during precipitation, after precipitation, or addition in parts to achieve dispersion and solidifying of the active component step by step, which leads to a significant improvement in the strength and ability of anti-high temperature strain;

(2) The catalysts of the invention have high mechanical strength, high anti-abrasion property, and easy separation from the Fischer-Tropsch synthesis products;

(3) The catalysts of the invention have high strength, high reactivity, suitability for high temperature operation. The catalyst can be operated in the slurry bed reactor to achieve the high temperature operation (250-300° C.) to improve the grade of steam, and further improve the energy efficiency of unit operations. Both conversion ability and space-time yield of snygas are relatively high.

(4) Significant tendency in the hydrocarbon products selectivity to the hydrocarbons with a medium-carbon number distribution when the catalyst according to the present invention is applied in the slurry bed reactor operation, but the selectivity of methane is much lower than that of the existing low temperature slurry process, which can be controlled at 4 wt % or less.

EXAMPLES

The technical solutions of the present invention will be described in detail according to the following examples which are not intended to limit the protection scope of the present invention in any way.

Example 1

282.11 kg of iron ingot, 2.78 kg of zinc, 2.78 kg of electrolytic chromium flake, and 2.80 kg of electrolytic copper were weighed and dissolved with nitric acid to prepare a mixed solution of the nitrates with a total concentration of 10.18 wt % for later use. The weight ratio of each component was Fe:Cr:Cu:Zn=100:1.00:1.00:1.01.

24.0 kg of silica sol, 4.6 kg of alumina sol, 125 g of zirconium nitrate, 86 g of titanium tetrachloride, and 42 g of ammonium molybdate and a small amount of water were weighed, then mixed and well dissolved. The resultant mixed sol was washed with deionized water until the content of $Cl^-$ ion could not be detected. The weight ratio of each component in the mixed sol was $SiO_2$:$Al_2O_3$:$ZrO_2$:$TiO_2$:$MoO_3$=100:13.33:0.50:0.50:0.50, and the solid content of the mixed sol was 33 wt %.

25.49 kg of the above mixed sol was taken, then added into the above mixed solution of the nitrates and stirred well, and then heated to 90° C.; a certain amount of ammonia water in a concentration of 5.5 wt % was taken and preheated to 60° C., and then co-precipitated with the above-mentioned mixed solution by continuous coflowing process at a temperature of 90° C. and a pH value of 6.0 under stirring, in which the amount of ammonia water was determined based on the conditions that the solution was completely precipitated and the pH of the slurry was maintained at 6.0; the obtained precipitated slurry was aged for 5 minutes after precipitation and then washed with deionized water until the content of $NH_4NO_3$ in the slurry was less than 0.1 wt %, and a filter cake was obtained with a solid content of 16.5 wt % after the precipitated being filtered.

Adding a certain amount of deionized water and 8.5 kg of potassium bicarbonate into the above obtained filter cake, then sufficiently pulping to obtain a slurry, and adjusting the pH value of the slurry to 6.5 and the solid content of the slurry to 10.5 wt %; spray-drying the above-prepared slurry materials in a pressurized spray-drying tower with an air inlet temperature of 420° C. and an air outlet temperature of 85° C.; roasting the dried spherical catalyst at 700° C. for 2 hours to obtain the desired catalyst of 772 kg. The weight ratio of each component in the catalyst was Fe:M:K:S=100:3.01:1.20:3.04. This catalyst was designated as A.

Example 2

2000.0 kg of iron nitrate, 213.0 kg of chromium nitrate, 15.8 kg of copper nitrate, and 360.0 kg of 50 wt % manganese nitrate solution were weighed and dissolved in 1500 kg of deionized water to obtain a mixed solution of the nitrates with a total concentration of 37.08 wt % for later use. The weight ratio of each component was Fe:Mn:Cr:Cu=100:20.0:10.0:1.50.

400.0 kg of silica sol, 5.0 kg of alumina sol, 25.1 kg of zirconium nitrate, 14.25 kg of titanium tetrachloride, 4.15 kg of ammonium molybdate, and an appropriate amount of deionized water were weighed, then mixed and well dissolved. The mixed sol was washed with deionized water until the content of $Cl^-$ ion could not be detected. The weight ratio of each component in the mixed sol was $SiO_2$:$Al_2O_3$:$ZrO_2$:$TiO_2$:$MoO_3$=100:1.0:6.0:5.0:3.0, and the solid content was 25.07 wt %.

165.54 kg of the above mixed sol was taken, then added into the above mixed solution of the nitrates and stirred well, and then heated to 50° C.; a certain amount of ammonia water in a concentration of 19.6 wt % was taken and preheated to 20° C., and then co-precipitated with the above mixed solution by continuous coflowing process at a temperature of 50° C. and a pH value of 9.5 under stirring, in which the amount of ammonia water was determined based on the conditions that the solution was completely precipitated and the pH of the slurry was maintained at 9.5; the obtained precipitated slurry was aged for 120 minutes after precipitation and then washed with deionized water until the content of $NH_4NO_3$ in the slurry was less than 0.5 wt %, and a filter cake with a solid content of 51.2 wt % was obtained after the precipitated slurry being filtered.

Adding a certain amount of deionized water and 55.5 kg of potassium acetate and 384.91 kg of the above obtained mixed sol into the filter cake, then sufficiently pulping to obtain a slurry, and adjusting the pH value of the slurry to 5.2 and the solid content of the slurry to 38.20 wt %; spray-drying the above-prepared slurry materials in a pressurized spray drying tower with an air inlet temperature of 180° C. and an air outlet temperature of 90° C.; roasting the dried spherical catalyst at 550° C. for 4 hours to obtain the desired catalyst of 645 kg. The weight ratio of each component in the catalyst was Fe:M:K:S=100:31.5: 8.0:49.91. This catalyst was designated as B.

Example 3

2000.0 kg of iron nitrate, 125.8 kg of zinc nitrate, 21.0 kg of copper nitrate, and 684.4 kg of 50 wt % manganese nitrate solution were weighed and dissolved in 8000 kg of deionized water to obtain a mixed solution of the nitrates with a total concentration of 15.10 wt % for later use. The weight ratio of each component was Fe:Mn:Zn:Cu=100:38.0:10.0: 2.0.

175.0 kg of silica sol, 7.31 kg of zirconium nitrate, 0.61 kg of ammonium molybdate, and an appropriate amount of deionized water were weighed, then mixed and well dissolved. The mixed sol was washed with deionized water until the content of $Cl^-$ ion could not be detected. The weight ratio of each component in the mixed sol was $SiO_2$:$ZrO_2$:$MoO_3$=100:4.0:1.0, and the solid content was 23.15 wt %.

The above mixed solution of the nitrates was heated to 80° C.; a certain amount of ammonia water in a concentration of 10.0 wt % was taken and preheated to 50° C., and then co-precipitated with the above-mentioned mixed solution of the nitrates by continuous coflowing process at a temperature of 80° C. and a pH value of 8.5 under stirring, in which the amount of ammonia water was determined based on the conditions that the solution was completely precipitated and the pH of the slurry was maintained at 8.5; the obtained precipitated slurry was aged for 10 minutes after precipitation, and then washed with deionized water until the content of $NH_4NO_3$ in the slurry was less than 0.2 wt %, and a filter cake with a solid content of 38.5 wt % was obtained after the precipitated slurry being filtered.

Adding a certain amount of deionized water, 19.53 kg of potassium carbonate and 238.13 kg of the above obtained mixed sol into the filter cake, then sufficiently pulping to obtain a slurry, and adjusting the pH value of the slurry to 9.2 and the solid content of the slurry to 28.90 wt %; spray-drying the above-prepared slurry materials in a pressurized spray-drying tower with an air inlet temperature of 270° C. and an air outlet temperature of 110° C.; roasting the dried spherical catalyst at 450° C. for 5 hours to obtain the desired catalyst of 628 kg. The weight ratio of each component in the catalyst was Fe:M:K:S=100:50.0:4.0:19.94. This catalyst was designated as C.

Example 4

2000.0 kg of iron nitrate, 10.65 kg of chromium nitrate, 125.0 kg of zinc nitrate, and 180.0 kg of 50 wt % manganese nitrate solution were weighed and dissolved in 2000 kg of deionized water to obtain a mixed solution of the nitrates with a total concentration of 31.82 wt % for later use. The weight ratio of each component was Fe:Mn:Zn:Cr=100: 10.0:10.0:0.5.

130.0 kg of alumina sol, 3.26 kg of zirconium nitrate, 0.75 kg of titanium tetrachloride, 1.80 kg of ammonium molybdate, and an appropriate amount of deionized water were weighed, then mixed and well dissolved. The mixed sol was washed with deionized water until the content of $Cl^-$ ion could not be detected. The weight ratio of each component in the mixed sol was $Al_2O_3$:$ZrO_2$:$TiO_2$:$MoO_3$=100:3.0:1.0: 4.0, and the solid content was 28.70 wt %.

29.63 kg of the above mixed sol was taken, then added into the above mixed solution of the nitrates and stirred well, and then heated to 70° C.; a certain amount of ammonia water in a concentration of 15.2 wt % was taken and preheated to 40° C., and then co-precipitated with the above mixed solution by continuous coflowing process at a temperature of 70° C. and a pH value of 9.2 under stirring, in which the amount of ammonia water was determined based on the conditions that the solution was completely precipitated and the pH value of the slurry was maintained at 9.2; the obtained precipitated slurry was aged for 90 minutes after precipitation and then washed with deionized water until the content of $NH_4NO_3$ in the slurry was less than 0.8 wt %, and a filter cake with a solid content of 28.5 wt % was obtained after the precipitated slurry being filtered.

Adding a certain amount of deionized water, 20.85 kg of potassium acetate and 88.88 kg of the above obtained mixed sol into the filter cake, then sufficiently pulping to obtain a slurry, and adjusting the pH of the slurry to 7.3 and the solid content of the slurry to 24.5 wt %; spray-drying the above-prepared slurry materials in a pressurized spray drying tower with an air inlet temperature of 280° C. and an air outlet temperature of 120° C.; roasting the dried spherical catalyst at 350° C. for 7.5 hours to obtain the desired catalyst of 490 kg, and the weight ratio of each component in the catalyst was Fe:M:K:S=100:20.5:3.0:12.30. This catalyst was designated as D.

Example 5

2000.0 kg of iron nitrate, 21.3 kg of chromium nitrate, 18.9 kg of zinc nitrate, 10.5 kg of copper nitrate, and 72.0 kg of 50 wt % manganese nitrate solution were weighed and dissolved in 3000 kg of deionized water to obtain a mixed solution of the nitrates with a total concentration of 24.72 wt % for later use. The weight ratio of each component was Fe:Mn:Zn:Cr:Cu=100:4.0:1.5:1.0:1.0.

200.0 kg of silica sol, 25.0 kg of alumina sol, 20.9 g of zirconium nitrate, 14.27 kg of titanium tetrachloride, 6.92 kg of ammonium molybdate, and an appropriate amount of deionized water were weighed, then mixed and well dissolved. The mixed sol was washed with deionized water until the content of $Cl^-$ ion could not be detected. The weight ratio of each component in the mixed sol was $SiO_2$:$Al_2O_3$: $ZrO_2$:$TiO_2$:$MoO_3$=100:10.0:10.0:10.0:10.0, and the solid content was 15.49 wt %.

54.23 kg of the above mixed sol was taken and added into the above mixed solution of the nitrates and stirred well, and then heated to 60° C.; a certain amount of ammonia water in a concentration of 12.5 wt % was taken and preheated to 40° C., and co-precipitated with the above-mentioned mixed solution by continuous coflowing process at a temperature of 60° C. and a pH value of 7.3, in which the amount of ammonia water was determined based on the conditions that the solution was completely precipitated and the pH value was maintained at 7.3; the obtained precipitated slurry was aged for 15 minutes after precipitation, then washed with deionized water until the content of $NH_4NO_3$ in the slurry was less than 0.6 wt %, and a filter cake with a solid content of 39.8 wt % was obtained after the precipitated slurry being filtered.

Adding a certain amount of deionized water, 42.5 kg of potassium bicarbonate and 488.1 kg of the above obtained mixed sol into the filter cake, then sufficiently pulping to obtain a slurry, and adjusting the pH of the slurry to 8.6 and the solid content of the slurry to 32.3 wt %; spray-drying the above-prepared slurry materials in a pressurized spray-drying tower with an air inlet temperature of 260° C. and an air outlet temperature of 100° C.; roasting the dried spherical catalyst at 500° C. for 6 hours to obtain the desired catalyst of 493 kg, and the weight ratio of each component in the catalyst was Fe:M:K:S=100:7.5:6.0:30.4. This catalyst was designated as E.

Example 6

2000.0 kg of iron nitrate, 10.65 kg of chromium nitrate, 6.3 kg of zinc nitrate, and 36.0 kg of 50 wt % manganese nitrate solution were weighed and dissolved in 1500 kg of deionized water to obtain a mixed solution of the nitrates with a total concentration of 34.50 wt % for later use. The weight ratio of each components was Fe:Mn:Zn:Cr=100: 2.0:0.5:0.5.

370.0 kg of silica sol, 3.85 kg of zirconium nitrate, 2.65 kg of titanium tetrachloride, and an appropriate amount of deionized water were weighed, then mixed and well dissolved. The mixed sol was washed with deionized water until the content of $Cl^-$ ion could not be detected. The weight ratio of each component in the mixed sol was $SiO_2$:$ZrO_2$: $TiO_2$=100:1.0:1.0, and the solid content was 35.12 wt %.

161.19 kg of the above mixed sol was weighed, then added into the mixed solution of the nitrates and stirred well, and then heated to 75° C.; a certain amount of ammonia water in a concentration of 17.2 wt % was taken and preheated to 45° C., and then co-precipitated with the above-mentioned mixed solution by continuous coflowing process at a temperature of 75° C. and a pH value of 6.5 under stirring, in which the amount of ammonia water was determined based on the conditions that the solution was completely precipitated and the pH value of the slurry was maintained at 6.5; the obtained precipitated slurry was aged for 100 minutes, then washed with deionized water until the content of $NH_4NO_3$ in the slurry was less than 0.5 wt % and a filter cake with a solid content of 43.0 wt % was obtained after the precipitated slurry being washed.

Adding a certain amount of deionized water, 34.2 kg of potassium carbonate and 161.19 kg of the above obtained mixed sol into the filter cake, then sufficiently pulping to obtain a slurry, and adjusting the pH value of the slurry to 8.8 and the solid content of the slurry to 21.9 wt %;

spray-drying the above-prepared slurry materials in a pressurized spray-drying tower with an air inlet temperature of 320° C. and an air outlet temperature of 145° C.; roasting the dried spherical catalyst at 650° C. for 3 hours to obtain the desired catalyst of 508 kg and the weight ratio of each component in the catalyst was Fe:M:K:S=100:3.0:7.0:40.95. This catalyst was designated as F.

Example 7

2000.0 kg of iron nitrate, 106.4 kg of chromium nitrate, 18.9 kg of zinc nitrate, and 144.0 kg of 50 wt % manganese nitrate solution were weighed and dissolved in 4000 kg of deionized water to obtain a mixed solution of the nitrates with a total concentration of 21.45 wt % for later use, and the weight ratio of each components was Fe:Mn:Zn:Cr=100: 8.0:1.5:5.0.

120.0 kg of silica sol, 150.0 kg of alumina sol, 1.88 kg of zirconium nitrate, 1.71 kg of titanium tetrachloride, 0.83 kg of ammonium molybdate, and an appropriate amount of deionized water were weighed, then mixed and well dissolved. The mixed sol was washed with deionized water until the content of $Cl^-$ ion could not be detected. The weight ratio of each component in the mixed sol was $SiO_2$:$Al_2O_3$:$ZrO_2$:$TiO_2$:$MoO_3$=100:100:1.5:2.0:2.0 and the solid content was 27.87 wt %.

The above mixed solution of the nitrates was heated to 85° C.; a certain amount of ammonia water in a concentration of 11.3 wt % was taken and preheated to 45° C., and then co-precipitated with the above-mentioned mixed solution by continuous coflowing process at a temperature of 80° C. and a pH value of 7.9 under stirring; The obtained slurry was aged for 35 minutes after precipitation, and then was washed with deionized water until the content of $NH_4NO_3$ in the slurry was less than 0.35 wt % and a filter cake with a solid content of 21.3 wt % was obtained after the precipitated slurry being filtered.

Adding a certain amount of deionized water, 24.45 kg of potassium carbonate and 265.44 kg of the above obtained mixed sol into the filter cake; then sufficiently pulping to obtain a slurry, and adjusting the pH value of the slurry to 9.4 and the solid content of the slurry to 16.3 wt %; spray-drying the above-prepared slurry materials in a pressurized spray-drying tower with an air inlet temperature of 380° C. and an air outlet temperature of 130° C.; roasting the dried spherical catalyst at 600° C. for 5 hours to obtain the desired catalyst of 510 kg and the weight ratio of each component in the catalyst was Fe:M:K:S=100:14.5:5.0:26.8. This catalyst was designated as G.

The following Table 1 lists the composition and physical properties of the prepared catalysts described in the examples 1-7.

TABLE 1

| Preparation conditions | | Catalyst labels | | | | | | |
|---|---|---|---|---|---|---|---|---|
| | | A | B | C | D | E | F | G |
| Dispersed and solidified sol composition | $SiO_2$ | 100 | 100 | 100 | — | 100 | 100 | 100 |
| | $Al_2O_3$ | 13.33 | 1.00 | — | 100.00 | 10.00 | — | 100 |
| | $ZrO_2$ | 0.50 | 6.00 | 4.00 | 3.00 | 10.00 | 1.00 | 1.50 |
| | $TiO_2$ | 0.50 | 5.00 | — | 1.01 | 10.00 | 1.00 | 2.00 |
| | $MoO_3$ | 0.51 | 3.00 | 1.01 | 4.00 | 10.00 | — | 2.00 |
| Catalyst composition (weight ratio) | Fe | 100 | 100 | 100 | 100 | 100 | 100 | 100 |
| | Mn | — | 19.99 | 38.00 | 9.99 | 4.00 | 2.00 | 8.00 |
| | Cr | 1.00 | 10.01 | — | 0.50 | 1.00 | 0.50 | 5.00 |
| | Zn | 1.00 | — | 10.00 | 9.94 | 1.50 | 0.50 | 1.50 |
| | Cu | 1.01 | 1.50 | 2.00 | — | 1.00 | — | — |
| | K | 1.20 | 8.00 | 4.00 | 3.00 | 6.00 | 7.00 | 5.00 |
| | Precipitating and the mixed sol | 3.04 | 15.01 | — | 3.08 | 3.04 | 20.48 | — |
| | Molding and the mixed sol | — | 34.90 | 19.94 | 9.23 | 27.35 | 20.48 | 26.76 |
| Catalyst composition | Concentration of salt solution (wt %) | 10.18 | 37.08 | 15.10 | 31.82 | 24.72 | 34.50 | 21.45 |
| | Concentration of ammonia water (wt %) | 5.5 | 19.60 | 10.00 | 15.20 | 12.50 | 17.20 | 11.30 |
| | Temperature of salt solution (° C.) | 90 | 50 | 80 | 70 | 60 | 75 | 85 |
| | Temperature of ammonia water (° C.) | 60 | 20 | 50 | 40 | 40 | 45 | 45 |
| | Preparation temperature (° C.) | 90 | 50 | 80 | 70 | 60 | 75 | 80 |
| | Preparation pH value | 6.0 | 9.5 | 8.5 | 9.2 | 7.3 | 6.5 | 7.9 |
| | Aging time (min) | 5 | 120 | 10 | 90 | 15 | 100 | 35 |
| Molding and roasting | pH value of the slurry | 6.5 | 5.2 | 9.2 | 7.3 | 8.6 | 8.8 | 9.4 |
| | Solid content of the slurry (wt %) | 10.50 | 38.20 | 28.90 | 24.50 | 32.30 | 21.90 | 16.30 |
| | Air inlet temperature (° C.) | 420 | 180 | 270 | 280 | 260 | 320 | 380 |
| | Air outlet temperature (° C.) | 85 | 90 | 110 | 120 | 100 | 145 | 130 |
| | Roasting temperature (° C.) | 700 | 550 | 450 | 350 | 500 | 650 | 600 |
| | Roasting time (h) | 2 | 4 | 5 | 7.5 | 6 | 3 | 5 |
| Structure properties and particle size | BET specific surface area (m²/g) | 108 | 320 | 230 | 165 | 180 | 307 | 132 |
| | Pore volume (cm³/g) | 0.29 | 0.57 | 0.40 | 0.35 | 0.38 | 0.53 | 0.33 |
| | Percentage of 30-180 μm | 93% | 97% | 98% | 95% | 96% | 96% | 94% |

Example 8

Using the catalysts prepared in the examples 1-7, the F-T synthesis reaction was performed in the slurry bed reactor under such catalyst reduction conditions and F-T synthesis reaction conditions as follows. The catalytic parameters of the performance of these F-T reactions are listed in Table 2.

Catalyst Reduction Conditions:

The catalysts were reduced for 5-48 hours by using syngas as a reduction atmosphere at a temperature of 230-350° C. and a pressure of 0.1-4.0 MPa. The space velocity used was 500-10000 $h^{-1}$.

F-T Synthesis Reaction Conditions in Slurry Bed Reactor:

The F-T reaction was performed in syngas with $H_2/CO$ ratio of 0.7-3.0 at a temperature of 250-300° C. and a pressure of 1.0-5.0 MPa. The space velocity of the fresh air was 8000 to 20000 $h^{-1}$.

The data in Table 2 demonstrate a high F-T synthesis reactivity of the catalysts according to the present invention for the F-T synthesis in a high temperature slurry bed reactor even at a high space velocity. The CO conversion was above 80% and the target hydrocarbon selectivity ($C_2^=\sim C_4^=+C_5^+$) maintain 90 wt % or higher, while $CH_4$ selectivity was less than 4.0%. Particularly, $C_5^+$ selectivity and yield are very high. Therefore, the catalysts according to the present invention are especially suitable for the high temperature slurry bed reactor to produce the products such as gasoline, diesel and wax from syngas.

TABLE 2

Catalytic performance of the catalysts according to the present invention

| F-T synthesis reactivity | Catalyst labels | | | | | | |
|---|---|---|---|---|---|---|---|
| | A | B | C | D | E | F | G |
| Reaction temperature | 260 | 255 | 290 | 270 | 280 | 275 | 290 |
| CO conversion (%) | 92.1 | 82.5 | 88.1 | 83.2 | 91.5 | 83.5 | 88.6 |
| Hydrocarbon selectivity (wt %) | | | | | | | |
| $CH_4$ | 2.9 | 2.3 | 3.2 | 4.0 | 2.7 | 3.6 | 3.5 |
| $C_2\sim C_4$ | 6.3 | 8.2 | 7.0 | 7.9 | 7.6 | 5.2 | 6.3 |
| $C_5^+$ | 90.8 | 89.5 | 89.8 | 88.1 | 89.7 | 91.2 | 90.2 |
| $C_2^=\sim C_4^= + C_5^+$ (wt %) | 94.3 | 94.1 | 92.8 | 91.9 | 94.0 | 94.4 | 93.2 |
| $C_2^=\sim C_4^=/C_2\sim C_4$ (%) | 55.2 | 56.2 | 43.2 | 47.5 | 56.8 | 62.1 | 47.9 |
| $CO_2$ selectivity (mol %) | 14.3 | 18.8 | 16.4 | 18.2 | 15.7 | 21.2 | 15.4 |
| Yield ($C_5^+$ g/g-cat./h) | 0.96 | 0.97 | 1.03 | 1.00 | 1.04 | 1.36 | 1.06 |

It is understood that the present invention has been described in combination of the detailed description, the foregoing description is intended to illustrate but not to limit the scope of the invention. It is obvious to the skilled in the art that various modifications and improvements can be made within the scope of the present invention without departing from the spirit of the present invention. All these modifications and improvements are within the scope of the present invention.

The invention claimed is:

1. A micro-spherical iron-based catalyst for Fischer-Tropsch synthesis in a high temperature slurry bed reactor, the catalyst including Fe element as a main active component, the catalyst comprising:
a K promoter, a transitional metal promoter M, and a structure promoter S, wherein the transitional metal promoter M is any combination of two or more kinds of metals selected from the group consisting of Cr, Cu, Mn and Zn; the structure promoter S is selected from the group consisting of $SiO_2$ and $Al_2O_3$, wherein the $SiO_2$ and $Al_2O_3$ are modified by at least one of $MoO_3$, $TiO_2$ and $ZrO_2$; and the Fe element, K promoter, transitional metal promoter M, and structure promoter S have a respective weight ratio of Fe:M:K:S=100:1-100:6-8:1-80, wherein the Fe element and the transitional metal promoter M are calculated based on metal elements, and the structure promoter S is calculated based on oxides.

2. The iron-based catalyst according to claim 1, wherein the weight ratio of each component is Fe:M:K:S=100:14.5-50:6-8:3-50.

3. The iron-based catalyst according to claim 2, wherein the transitional metal promoter M is any combination of three or four kinds of metals selected from the group consisting of Cr, Cu, Mn, and Zn.

4. The iron-based catalyst according to claim 1, wherein the weight ratio of each component in the structure promoter S is (at least one of $MoO_3$, $TiO_2$ and $ZrO_2$):(at least one of $SiO_2$ and $Al_2O_3$)=1-50:100.

5. The iron-based catalyst according to claim 4, wherein the weight ratio of each component in the structure promoter S is (at least one of $MoO_3$, $TiO_2$ and $ZrO_2$):(at least one of $SiO_2$ and $Al_2O_3$)=1-30:100.

6. The iron-based catalyst according to claim 5, wherein, in the structure promoter S, two or three kinds of components selected from the group consisting of $MoO_3$, $TiO_2$ and $ZrO_2$ exist simultaneously.

7. A method of preparing the iron-based catalyst of claim 6 comprising:
(1) preparing a solution of metal nitrates by using metal Fe, the transition metal promoter M and nitric acid as raw materials; or preparing a mixed solution of metal nitrates by directly dissolving the metal nitrates of the mixed solution; the solution of the metal nitrates is in a total concentration of 5-45 wt %; and adding the structure promoter S into the solution of metal nitrates;
(2) co-precipitating the solution of metal nitrates prepared in step (1) to produce a precipitated slurry by using ammonium water in a concentration of 1-25 wt % as a precipitant, wherein the precipitation temperature is 20-95° C.; during the co-precipitation, maintaining a pH value between 6.0-9.5; and aging the precipitated slurry after precipitation, thereby obtaining a final pH value of the precipitated slurry of 5-10;
(3) washing and filtering the precipitated slurry prepared in step (2) to obtain a filter cake with a solid content of 5-60 wt %;
(4) adding potassium salt as the K promoter and deionized water into the filter cake, pulping to obtain a slurry, and adjusting the pH value of the slurry to 4-10, then emulsifying the slurry to obtain a catalyst slurry with a solid content of 3-50 wt %;
(5) molding the catalyst slurry prepared in step (4) by spray-drying the catalyst slurry in a pressurized spray-drying tower, and roasting the molded catalyst to obtain the catalyst; wherein the addition of the structure promoter S in step (1) is changed to be performed in step (4); or respectively adding part of the structure promoter S in steps (1) and (4).

8. The method according to claim 7, wherein the structure promoter S is added by respectively adding part of the structure promoter S in steps (1) and (4), and the weight ratio of Fe to the structure promoter S in the solution of metal nitrates is not less than 100/25 after the addition of the structure promoter S in step (1).

9. The method according to any one of claims 7-8, wherein the raw material of the structure promoter S is silica sol, potash water glass, and/or alumina sol.

10. The method according to any one of claims 7-8, wherein the mixed solution of metal nitrates in step (1) is prepared by metal nitrates.

11. The method according to any one of claims 7-8, wherein, in step (2), the precipitant of ammonia water is in the concentration of 5-20 wt %, and/or the precipitation temperature is 50-90° C.

12. The method according to claim 11, wherein, in step (3), the filter cake obtained by washing and filtering the precipitated slurry contains less than 2.5 wt % ammonium nitrate, and/or the solid content in the filter cake is 15-50 wt %.

13. The method according to claim 12, wherein, the potassium salt in step (4) is at least one member selected from the group consisting of potassium bicarbonate, potassium acetate, organic sylvite and potash water glass; and/or the pH value of the slurry in step (4) is 5.0-9.5; and the solid content in the catalyst slurry is 10-40 wt %.

14. Using the Fe-based catalyst according to any one of claims 1-5 in the Fischer-Tropsch synthesis reaction, wherein the Fischer-Tropsch synthesis reaction is carried out in a slurry bed at a temperature range of 240-280° C.

* * * * *